United States Patent [19]
Tsai et al.

[11] Patent Number: 6,010,971
[45] Date of Patent: Jan. 4, 2000

[54] POLYETHYLENE OXIDE THERMOPLASTIC COMPOSITION

[75] Inventors: Fu-Jya Tsai; Brian T. Etzel, both of Appleton, Wis.

[73] Assignee: Kimberly-Clark Worldwide, Inc., Neenah, Wis.

[21] Appl. No.: 08/976,171

[22] Filed: Nov. 21, 1997

[51] Int. Cl.$^7$ ................................. B32B 5/26; C08K 5/09
[52] U.S. Cl. ........................ 442/381; 604/370; 604/372; 604/378; 524/321
[58] Field of Search ........................... 524/321; 442/381, 442/389; 604/370, 372, 378

[56] References Cited

U.S. PATENT DOCUMENTS

| | | | |
|---|---|---|---|
| 3,664,343 | 5/1972 | Assarsson . | |
| 3,946,089 | 3/1976 | Furukawa et al. | 260/857 PG |
| 4,649,920 | 3/1987 | Rhum | 128/335.5 |
| 4,818,542 | 4/1989 | DeLuca et al. | 424/491 |
| 5,120,701 | 6/1992 | Brand et al. | 502/350 |
| 5,290,494 | 3/1994 | Coombes et al. | 264/41 |
| 5,330,768 | 7/1994 | Park et al. | 424/501 |
| 5,413,797 | 5/1995 | Khan et al. | 424/489 |
| 5,417,712 | 5/1995 | Whittaker et al. | 606/232 |
| 5,476,909 | 12/1995 | Kim et al. | 525/408 |
| 5,514,380 | 5/1996 | Song et al. | 424/426 |

FOREIGN PATENT DOCUMENTS

| | | | |
|---|---|---|---|
| 0 241 178 A1 | 10/1987 | European Pat. Off. | A61K 9/70 |
| 7-133511 | 5/1995 | Japan | D01F 8/12 |
| WO 90/05522 A1 | 5/1990 | WIPO | A61K 9/22 |
| WO 92/04923 A1 | 4/1992 | WIPO | A61L 15/01 |
| WO 93/10731 A1 | 6/1993 | WIPO | A61F 13/00 |
| WO 94/06856 | 3/1994 | WIPO . | |
| WO 98/29493 | 7/1998 | WIPO . | |

OTHER PUBLICATIONS

American Society for Testing Materials (ASTM) Designation: D 1238–95, "Standard Test Method for Flow Rates of Thermoplastics by Extrusion Plastometer," pp. 273–281, published Jan. 1996.
Good, Robert J. and Robert J. Stromberg, Editors, Surface and Colloid Science–Experimental Methods, vol. II, Plenum Press, 1979, pp. 31–91.
Derwent World Patent Database abstract of GB 1,289,305 A: Description of Imperial Chemical Ind., "Polyesters." (No Date).
Derwent World Patent Database abstract of JP 05–093,316 A: Description of Unitika Ltd (Nira), "Biodegradable Conjugated Fibre For Construction, Fishery, Etc." (No Date).
Derwent World Patent Database abstract of JP 05–093,317 A: Description of Unitika Ltd (Nira), "Crimpable Biodegradable Conjugated Fibre For Napkins, Etc." (No Date).
Derwent World Patent Database abstract of JP 05–093,318 A: Description of Unitika Ltd (Nira), "Biodegradable Conjugated Fibre For Nonwoven Fabric For Sanitary Goods, Fishery, Etc." (No Date).

Derwent World Patent Database abstract of JP 06–022,995 A: Description of Yokoi T, "Water–Soluble Contraceptive Article Having High Cleanliness And High Barrier Against Viruses." (No Date).
Derwent World Patent Database abstract of JP 06–207,320 A: Description of Unitika Ltd (Nira), "Biodegradable Conjugate Short Fibre For Nonwoven Fabric For Sanitary Items." (No Date).
Derwent World Patent Database abstract of JP 06–207,323 A: Description of Unitika Ltd (Nira), "Biodegradable Latent Crimping Conjugate Core–Sheath Type Long Fibre." (No Date).
Derwent World Patent Database abstract of JP 06–207,324 A: Description of Unitika Ltd (Nira), "Biodegradable Conjugate Core–Sheath Type Long Fibre." (No Date).
Derwent World Patent Database abstract of JP 06–212,548 A: Description of Unitika Ltd (Nira), "BIodegradable Latent Crimpable Conjugate Short Fibre For Nonwoven Fabric." (No Date).
Derwent World Patent Database abstract of JP 06–248,552 A: Description of Daiwabo Create Co. Ltd., "Biodegradable Fibre Composition." (No Date).
Derwent World Patent Database abstract of RU 2,048,299 C1: Description of N.N. Melentev et al., "Synthesis Of Composite Materials From Poly–Dispersed Systems." (No Date).
Derwent World Patent Database abstract of WO 92/11844 A1: Description of H.E. Auer et al., "Sustained Release Delivery Systems For Proteins Or Peptide(s)." (No Date).
Derwent World Patent Database abstract of WO 93/00050 A1: Description of B.S. Isaacs et al., "Composition For Stimulating Growth Of Bone Or Cartilage." (No Date).
Derwent World Patent Database abstract of WO 94/12158 A1: Description of H. Auer et al., "Growth Hormone Microsphere Controlled Release Formulation." (No Date).
Chemical Abstract 108(4)26944j: Description of Hani Younes et al., "Morphological Study Of Biodegradable PEO/PLA Block Copolymers," *J. Biomed. Mater. Res.*, 1987, vol. 21, No. 11, pp. 1301–1316.
Chemical Abstract 109(24)215956w: Description of Daniel Cohn et al., "A Selectively Biodegadable Vascular Graft," *Prog. Biomed. Eng.*, 1988, vol. 5, No. Polym. Med. 3, pp .73–79.
Chemical Abstract 110(8)63680g: Description of H. Younes et al., "Biodegradable PELA Block Copolymers: In Vitro Degradation And Tissue Reaction," *Biomater., Artif. Cells, Artif. Organs*, 1988, vol. 16, No. 4, pp. 705–719.

(List continued on next page.)

*Primary Examiner*—Christopher Raimund
*Attorney, Agent, or Firm*—Jones & Askew, LLP

[57] ABSTRACT

Disclosed is a thermoplastic composition that comprises a unreacted mixture of polyethylene oxide polymer and a multicarboxylic acid. One embodiment of such a thermoplastic composition is a mixture of polyethylene oxide polymer and adipic acid. The thermoplastic composition is capable of being extruded into fibers that may be formed into nonwoven structures that may be used in a disposable absorbent product intended for the absorption of fluids such as body fluids.

27 Claims, No Drawings

OTHER PUBLICATIONS

Chemical Abstract 110(4)29042r: Description of Daniel Cohn et al., "Biodegradable PEO/PLA Block Copolymers," *J. Biomed. Mater. Res.*, 1988, vol. 22, No. 11, pp. 993–1009.

Chemical Abstract 111(16)134863c: Description of K.J. Zhu et al., "Super Microcapsules," *J. Polym. Sci., Part A: Polym. Chem.*, 1989, vol. 27, No. 7, pp. 2151–2159.

Chemical Abstract 112(8)62574e: Description of Daniel Cohn et al., "Compositional And Structural Analysis Of PELA Biodegradable Block," *Biomaterials*, 1989, vol. 10, No. 7, pp. 466–474.

Chemical Abstract 115(8)72647g: Description of Xiaobing Zou et al., "Carbon–13 NMR Relaxation Study On Poly-(Ethylene Oxide)–Polyllactide Star–Block Copolymer," *Fenxi Ceshi Tongbao*, 1990, vol. 9, No. 5, pp. 18–26.

Chemical Abstract 119(24)250977g: Description of Chitoshi Nakafuku et al., "Melting And Crystallization Of Poly(L–Lactic Acid) And Poly(Ethylene Oxide) Binary Mixture," *Polym. J.(Tokyo)*, 1993, vol. 25, No. 9, pp. 909–917.

Chemical Abstract 121(4)36571t: Description of Chitoshi Nakafuku, "High Pressure Crystallization Of Poly(L–Lactic Acid) In A Binary Mixture With Poly(Ethylene Oxide)," *Polym. J. (Tokyo)*, 1994, vol. 26, No. 6, pp. 680–687.

Chemical Abstract 123(20)258609s: Description of C.L. Yue et al., "Miscibility And Degradability Of Poly(Lactic Acid)/Poly(Ethylene Oxide)/Poly(Ethylene Glycol)Blends," *Polym. Prepr. (Am. Chem. Soc., Div. Polym. Chem.)*, 1995, vol. 36, No. 1, pp. 418–419.

Chemical Abstract 124(2)9578f: Description of I. Rashkov et al., "Synthesis, Characterization, and Hydrolytic Degradation Of PLA/PEO/PLA Triblock Copolymers With Short Poly(L–Lactic Acid) Chains," *Macromolecules*, 1996, vol. 29, No. 1, pp. 50–56.

Chemical Abstract 124(4)30530u: Description of S.M. Li et al., "Synthesis, Characterization, and Hydrolytic Degradation Of PLA/PEO/PLA Triblock Copolymers With Long Poly(L–Lactic Acid) Blocks," *Macromolecules*, 1996, vol. 29, No. 1, pp. 57–62.

Chemical Abstract 125(8)87792f: Description of Kwang–Suk Kim et al., "Effect Of PLA–PEO Block Copolymers On The Compatibility Of PLA/PEO Blends," *Pollimo*, 1996, vol. 20, No. 3, pp. 497–505.

Chemical Abstract 125(8)95740c: Description of T. Kissel et al., "Parenteral Protein Delivery Systems Using Biodegradable Polyesters Of ABA Block Structure, Containing Hydrophobic Poly(Lactide–Co–Glycolide) A Blocks And Hydrophilic Poly(Ethylene Oxide) B Blocks," *J. Controlled Release*, 1996, vol. 39, No. 2,3, pp. 315–326.

Chemical Abstract 125(10)115694w: Description of Chitoshi Nakafuku, "Effect Of Molecular Weight On The Melting And Crystallization Of Poly(L–Lactic Acid) In A Mixture With Poly(Ethylene Oxide)," *Polym. J. (Tokyo)*, 1996, vol. 28, No. 7, pp. 568–575.

Chemical Abstract 125(12)144076b: Description of C.L. Yue et al., "Miscibility And biodegradability Of Poly(Lactic Acid)/poly(Ethylene Oxide) And Poly(Lactic Acid)/Polyethylene Glycol Blends," *Annu. Tech. Conf.–Soc. Plast. Eng.*, 1996, vol. 54, No. 2, pp. 1611–1615.

Chemical Abstract 125(16)204203c: Description of Michaella Vittaz et al., "Effect Of PEO Surface Density On Long–Circulating PLA–PEO Nanoparticles Which Are Very Low Complement Activators," *Biomaterials*, 1996, vol. 17, No. 16, pp. 1575–1581.

Chemical Abstract 125(16)204264y: Description of Y.K. Choi et al., "Protein Release From Microspheres Of Star–Shaped PEO–PLA Block Copolymers," *Proc. Int. Symp. Controlled Release Bioact. Mater.*, 1996, vol. 23, pp. 349–350.

POLYETHYLENE OXIDE THERMOPLASTIC COMPOSITION

BACKGROUND OF THE INVENTION

1. Field of the Invention

The present invention relates to a thermoplastic composition that comprises a unreacted mixture of polyethylene oxide and a multicarboxylic acid. The thermoplastic composition is capable of being extruded into fibers that may be formed into nonwoven structures that may be used in a disposable absorbent product intended for the absorption of fluids such as body fluids.

2. Description of the Related Art

Disposable absorbent products currently find widespread use in many applications. For example, in the infant and child care areas, diapers and training pants have generally replaced reusable cloth absorbent articles. Other typical disposable absorbent products include feminine care products such as sanitary napkins or tampons, adult incontinence products, and health care products such as surgical drapes or wound dressings. A typical disposable absorbent product generally comprises a composite structure including a topsheet, a backsheet, and an absorbent structure between the topsheet and backsheet. These products usually include some type of fastening system for fitting the product onto the wearer.

Disposable absorbent products are typically subjected to one or more liquid insults, such as of water, urine, menses, or blood, during use. As such, the outer cover backsheet materials of the disposable absorbent products are typically made of liquid-insoluble and liquid impermeable materials, such as polypropylene films, that exhibit a sufficient strength and handling capability so that the disposable absorbent product retains its integrity during use by a wearer and does not allow leakage of the liquid insulting the product.

Although current disposable baby diapers and other disposable absorbent products have been generally accepted by the public, these products still have need of improvement in specific areas. For example, many disposable absorbent products can be difficult to dispose of. For example, attempts to flush many disposable absorbent products down a toilet into a sewage system typically lead to blockage of the toilet or pipes connecting the toilet to the sewage system. In particular, the outer cover materials typically used in the disposable absorbent products generally do not disintegrate or disperse when flushed down a toilet so that the disposable absorbent product cannot be disposed of in this way. If the outer cover materials are made very thin in order to reduce the overall bulk of the disposable absorbent product so as to reduce the likelihood of blockage of a toilet or a sewage pipe, then the outer cover material typically will not exhibit sufficient strength to prevent tearing or ripping as the outer cover material is subjected to the stresses of normal use by a wearer.

Furthermore, solid waste disposal is becoming an ever increasing concern throughout the world. As landfills continue to fill up, there has been an increased demand for material source reduction in disposable products, the incorporation of more recyclable and/or degradable components in disposable products, and the design of products that can be disposed of by means other than by incorporation into solid waste disposal facilities such as landfills.

As such, there is a need for new materials that may be used in disposable absorbent products that generally retain their integrity and strength during use, but after such use, the materials may be more efficiently disposed of. For example, the disposable absorbent product may be easily and efficiently disposed of by composting. Alternatively, the disposable absorbent product may be easily and efficiently disposed of to a liquid sewage system wherein the disposable absorbent product is capable of being degraded.

Polyethylene oxide is a known material and has been used widely in a variety of applications. However, the processing of polyethylene oxide into a fiber, a film, or other extrudable or nonwoven structures has proven to be a significant challenge. This challenging task has been found to be particularly acute when trying to use polyethylene oxide in a fiber making process. Such processing difficulty is due, in part, to the fact that commercially-available polyethylene oxide typically comes in a powder form and is predominately available in high molecular weight versions, typically ranging in a weight average molecular weight from over 100,000 to 8,000,000.

Such a physical form or properties of the polyethylene oxide has been found to negatively impact the processing of the polyethylene oxide in several ways. First, any material, including polyethylene oxide, in a powder form is generally more difficult to process in terms of feeding and extrusion as compared to a material in a pelletized form, such as is typically encountered, for example, with polyolefins. Second, the high molecular weight of the polyethylene oxide typically results in significant entanglement of the polyethylene oxide polymer chains during certain processing techniques, such as extrusion. An extruder being used in such a situation will typically require a very large torque to feed the high molecular weight material through it which typically results in a pronounced "elastic-retraction" property of the molten fiber being processed which generally results in the molten fiber resisting being drawn down as it exits a spinneret attached to the extruder. These factors generally result in a very poor melt strength of the resultant fiber and make fiber spinning impracticable. Third, polyethylene oxide has a very low melting temperature, generally about 65° C., which makes the polyethylene oxide difficult to solidify during quenching and which causes process difficulties due to the stickiness of fiber prepared from the polyethylene oxide.

In addition, polyethylene oxide is generally a water soluble polymer. As such, even if one were able to prepare fibers from polyethylene oxide, such fibers would have a limited usefulness in applications in which the fibers were to be insulted with a liquid such as water, urine, blood, or menses. Thus, it would be desirable to be able to make a fiber comprising polyethylene oxide which was not instantly water soluble but instead exhibited a delayed solubility in, for example, water or other aqueous liquids.

It is therefore an object of the present invention to provide a thermoplastic composition comprising polyethylene oxide which exhibits improved processability properties and desirable solubility properties.

It is also an object of the present invention to provide a thermoplastic composition comprising polyethylene oxide which may be easily and efficiently formed into a fiber.

It is also an object of the present invention to provide a thermoplastic composition comprising polyethylene oxide which is suitable for use in preparing nonwoven structures.

It is also an object of the present invention to provide a fiber or nonwoven structure that is readily degradable in the environment.

SUMMARY OF THE INVENTION

The present invention concerns a thermoplastic composition that is desirably biodegradable and yet which is easily prepared and readily processable into desired final structures, such as fibers or nonwoven structures.

One aspect of the present invention concerns a thermoplastic composition that comprises a mixture of a first component and a second component.

One embodiment of such a thermoplastic composition comprises a mixture of a polyethylene oxide and a multicarboxylic acid, wherein the multicarboxylic acid has a total of carbon atoms that is less than about 30, wherein the thermoplastic composition exhibits desired properties.

In another aspect, the present invention concerns a fiber prepared from the thermoplastic composition wherein the fiber exhibits desired properties.

In another aspect, the present invention concerns a nonwoven structure comprising a fiber prepared from the thermoplastic composition.

One embodiment of such a nonwoven structure is a backsheet useful in a disposable absorbent product.

In another aspect, the present invention concerns a disposable absorbent product comprising a nonwoven structure comprising a fiber prepared from the thermoplastic composition.

DETAILED DESCRIPTION OF THE PREFERRED EMBODIMENTS

The present invention is directed to a thermoplastic composition which includes a first component and a second component. As used herein, the term "thermoplastic" is meant to refer to a material that softens when exposed to heat and generally returns to its original condition when cooled to room temperature.

The first component in the thermoplastic composition is a polyethylene oxide polymer. Suitable polyethylene oxide polymers are known and may be obtained, for example, from Union Carbide Corporation of Danbury, Conn.

The polyethylene oxide polymer suitable for use in the present invention is desirably water soluble. As used herein, a material will be considered to be water soluble when it substantially dissolves in excess water to form a solution, thereby losing its initial form and becoming essentially molecularly dispersed throughout the water solution. As a general rule, a water-soluble material will be free from a substantial degree of crosslinking, as crosslinking tends to render a material water insoluble.

As used herein, the term "water-insoluble" is meant to refer to a material that, when exposed to an excess of water, disperses but does not dissolve into the solution. As such, a water-insoluble material generally retains its original identity or physical structure, but in a highly dispersed state and must have sufficient physical integrity to resist flow and fusion with neighboring materials.

It is generally desired that the polyethylene oxide polymer exhibit a weight average molecular weight that is effective for the thermoplastic composition to exhibit desirable melt strength, fiber mechanical strength, and fiber spinning properties. In general, if the weight average molecular weight of a polyethylene oxide polymer is too high, this represents that the polymer chains may become heavily entangled which may result in a thermoplastic composition comprising that polyethylene oxide polymer being difficult to process. Conversely, if the weight average molecular weight of a polyethylene oxide polymer is too low, this represents that the polymer chains are not entangled enough which may result in a thermoplastic composition comprising that polyethylene oxide polymer exhibiting a relatively weak melt strength, making high speed processing very difficult. Thus, polyethylene oxide polymers suitable for use in the present invention exhibit weight average molecular weights that are beneficially between about 100,000 to about 20,000,000, more beneficially between about 150,000 to about 10,000,000, and suitably between about 200,000 to about 8,000,000. The weight average molecular weight for polymers or polymer blends can be determined using a method as described in the Test Methods section herein.

It is generally desired that the polyethylene oxide polymer be melt processable. It is therefore desired that the polyethylene oxide polymers used in the present invention exhibit a melt flow rate that is beneficially between about 1 gram per 10 minutes to about 600 grams per 10 minutes, suitably between about 5 grams per 10 minutes to about 200 grams per 10 minutes, and more suitably between about 10 grams per 10 minutes to about 150 grams per 10 minutes. The melt flow rate of a material may be determined according to ASTM Test Method D1238-E, incorporated in its entirety herein by reference.

It is generally desired that the polyethylene oxide be present in the thermoplastic composition in an amount effective to result in the thermoplastic composition exhibiting desired properties. If the polyethylene oxide is present in the thermoplastic composition in too small of an amount, the thermoplastic composition will generally exhibit poor extrusion processability properties represented, for example, by exhibiting too low of an apparent viscosity during processing at conditions, for example, of about 190° C. and a shear rate of about 1000 seconds$^{-1}$ as well as being too insoluble in, for example, water or other aqueous liquids, thereby limiting the use of such fibers in applications such as disposable absorbent products where the disposable absorbent product is desired to be flushable. In contrast, if the polyethylene oxide is present in the thermoplastic composition in too large of an amount, the thermoplastic composition will generally exhibit poor extrusion processability properties represented, for example, by exhibiting too high of an apparent viscosity during processing at conditions, for example, of about 190° C. and a shear rate of about 1000 seconds$^{-1}$ as well as being too quickly soluble in, for example, water or other aqueous liquids, thereby limiting the use of such fibers in applications such as disposable absorbent products.

Therefore, the polyethylene oxide will be present in the thermoplastic composition of the present invention in a weight amount that is beneficially between about 25 weight percent to about 85 weight percent, more beneficially between about 30 weight percent to about 80 weight percent, and suitably between about 35 weight percent to about 75 weight percent, wherein all weight percents are based on the total weight amount of the polyethylene oxide and the multicarboxylic acid present in the thermoplastic composition.

The second component in the thermoplastic composition is a multicarboxylic acid. A multicarboxylic acid is any acid that comprises two or more carboxylic acid groups. Suitable for use in the present invention are dicarboxylic acids, which comprise two carboxylic acid groups. It is generally desired that the multicarboxylic acid have a total number of carbons that is not too large because then the multicarboxylic acid may negatively interfere with the processing of the thermoplastic composition. It is therefore desired that the multicarboxylic acid have a total of carbon atoms that is beneficially less than about 30, more beneficially between about 3 to about 30, suitably between about 4 to about 20, and more suitably between about 5 to about 10. Suitable multicarboxylic acids include, but are not limited to, malonic acid, citric acid, succinic acid, glutaric acid, adipic acid, pimelic acid, suberic acid, azelaic acid, sebacic acid, and mixtures thereof.

The multicarboxylic acids suitable for use in the present invention are generally water soluble but generally exhibit a solubility that is relatively slower than the exhibited by polyethylene oxide. As such, the adding of the multicarboxylic acid to a polyethylene oxide generally reduces or slows down the water-solubility of the overall mixture.

It is generally desired that the multicarboxylic acid be present in the thermoplastic composition in an amount effective to result in the thermoplastic composition exhibiting desired properties. If the multicarboxylic acid is present in the thermoplastic composition in too small of an amount, the thermoplastic composition will generally exhibit poor extrusion processability properties represented, for example, by exhibiting too high of an apparent viscosity during processing at conditions, for example, of about 190° C. and a shear rate of about 1000 seconds$^{-1}$ as well as being too quickly soluble in, for example, water or other aqueous liquids, thereby limiting the use of such fibers in applications such as disposable absorbent products. In contrast, if the polyethylene oxide is present in the thermoplastic composition in too large of an amount, the thermoplastic composition will generally exhibit poor extrusion processability properties represented, for example, by exhibiting too low of an apparent viscosity during processing at conditions, for example, of about 190° C. and a shear rate of about 1000 seconds$^{-1}$ as well as being too insoluble in, for example, water or other aqueous liquids, thereby limiting the use of such fibers in applications such as disposable absorbent products where the disposable absorbent product is desired to be flushable.

Therefore, the multicarboxylic acid will be present in the thermoplastic composition in a weight amount that is beneficially between about 15 weight percent to about 75 weight percent, more beneficially between about 20 weight percent to about 70 weight percent, and suitably between about 25 weight percent to about 65 weight percent, wherein all weight percents are based on the total weight amount of the polyethylene oxide polymer and the multicarboxylic acid present in the thermoplastic composition.

In the present invention, it is generally desired that both the polyethylene oxide polymer and the multicarboxylic acid be biodegradable. As a result, the thermoplastic composition comprising the polyethylene oxide polymer and the multicarboxylic acid, either in the form of a fiber or in the form of a nonwoven structure, will be degradable when disposed of to the environment and exposed to air and/or water. As used herein, "biodegradable" is meant to represent that a material degrades from the action of naturally occurring microorganisms such as bacteria, fungi, and algae.

In the present invention, it is also desired that the polyethylene oxide polymer and the multicarboxylic acid be compostable. As a result, the thermoplastic composition comprising the polyethylene oxide polymer and the multicarboxylic acid, either in the form of a fiber or in the form of a nonwoven structure, will be compostable when disposed of to the environment and exposed to air and/or water. As used herein, "compostable" is meant to represent that a material is capable of undergoing biological decomposition in a compost site such that the material is not visually distinguishable and breaks down into carbon dioxide, water, inorganic compounds, and biomass, at a rate consistent with known compostable materials.

While the principal components of the thermoplastic composition of the present invention have been described in the foregoing, such thermoplastic composition is not limited thereto and can include other components not adversely effecting the the desired properties of the thermoplastic composition. Exemplary materials which could be used as additional components would include, without limitation, pigments, antioxidants, stabilizers, surfactants, waxes, flow promoters, solid solvents, plasticizers, nucleating agents, particulates, and materials added to enhance processability of the thermoplastic composition. If such additional components are included in a thermoplastic composition, it is generally desired that such additional components be used in an amount that is beneficially less than about 5 weight percent, more beneficially less than about 3 weight percent, and suitably less than about 1 weight percent, wherein all weight percents are based on the total weight amount of the polyethylene oxide polymer, the multicarboxylic acid, and the additional components present in the thermoplastic composition.

The thermoplastic composition of the present invention is simply a mixture of the polyethylene oxide polymer, the multicarboxylic acid, and, optionally, any additional components. In order to achieve the desired properties for the thermoplastic composition of the present invention, it has been discovered that it is critical that the polyethylene oxide polymer and the multicarboxylic acid remain substantially unreacted with each other such that a copolymer comprising each of the polyethylene oxide polymer and the multicarboxylic acid is not formed. As such, each of the polyethylene oxide polymer and the multicarboxylic acid remain distinct components of the thermoplastic composition. In order to determine if the polyethylene oxide polymer and the multicarboxylic acid remain essentially unreacted, it is possible to use techniques, such as nuclear magnetic resonance and infrared analysis, to evaluate the chemical characteristics of the final thermoplastic composition.

Each of the polyethylene oxide polymer and the multicarboxylic acid will generally form separate regions or domains within a prepared mixture forming the thermoplastic composition. However, depending on the relative amounts that are used of each of the polyethylene oxide polymer and the multicarboxylic acid, an essentially continuous phase may be formed from the material that is present in the thermoplastic composition in a relatively greater amount. In contrast, the material that is present in the thermoplastic composition in a relatively lesser amount may form an essentially discontinuous phase, forming separate regions or domains within the continuous phase of the more prevalent material wherein the more prevalent material continuous phase substantially encases the less prevalent material within its structure. As used herein, the term "encase", and related terms, are intended to mean that the more prevalent material continuous phase substantially encloses or surrounds the less prevalent material's separate regions or domains.

In the thermoplastic composition of the present invention, the multicarboxylic acid is believed to perform at least one important function. When the thermoplastic composition is in a molten state, the multicarboxylic acid is believed to function as a process lubricant or plasticizer that facilitates the processing of the thermoplastic composition while increasing the flexibility and toughness of a final product, such as a fiber or a nonwoven structure, through internal modification of the polyethylene oxide polymer. While not intending to be bound hereby, it is believed that the multicarboxylic acid replaces the secondary valence bonds holding together the polyethylene oxide polymer chains with multicarboxylic acid-to-polyethylene oxide polymer valence bonds, thus facilitating the movement of the polyethylene oxide polymer chain segments. This effect is evidenced, for example, in that a generally lower extrusion temperature may be used to process the thermoplastic composition comprising both the polyethylene oxide polymer and the multicarboxylic acid as compared to the processing of polyethylene oxide polymer alone. With this effect, the torque needed to turn an extruder is generally dramatically reduced as compared with the processing of polyethylene oxide polymer alone.

In one embodiment of the present invention, after dry mixing together the polyethylene oxide polymer and the multicarboxylic acid to form a thermoplastic composition dry mixture, such thermoplastic composition dry mixture is beneficially agitated, stirred, or otherwise blended to effectively uniformly mix the polyethylene oxide polymer and the multicarboxylic acid such that an essentially homogeneous dry mixture is formed. The dry mixture may then be melt blended in, for example, an extruder to effectively uniformly mix the polyethylene oxide polymer and the multicarboxylic acid such that an essentially homogeneous melted mixture is formed. The essentially homogeneous melted mixture may then be cooled and pelletized. Alternatively, the essentially homogeneous melted mixture may be sent directly to a spin pack or other equipment for forming fibers or a nonwoven structure. Other methods of mixing together the components of the present invention are also possible and will be easily recognized by one skilled in the art.

The process of cooling the extruded thermoplastic composition to ambient temperature is usually achieved by blowing ambient or sub-ambient temperature air over the extruded polymer. It can be referred to as quenching or super-cooling because the change in temperature is usually greater than 100° C. and most often greater than 150° C. over a relatively short time frame (seconds).

It is generally desired that the melting or softening temperatures of the thermoplastic composition be within a range that is typically encountered in most process applications. As such, it is generally desired that the melting or softening temperatures of the thermoplastic composition beneficially be between about 25° C. to about 350° C., more beneficially be between about 50° C. to about 300° C., and suitably be between about 60° C. to about 200° C.

The thermoplastic composition of the present invention has been found to generally exhibit improved processability properties as compared to a thermoplastic composition comprising the polyethylene oxide polymer but none of the multicarboxylic acid. As used herein, the improved processability of a thermoplastic composition is measured as a decline in the apparent viscosity of the thermoplastic composition at a temperature of about 190° C. and a shear rate of about 1000 seconds$^{-1}$, typical industrial extrusion processing conditions. If the thermoplastic composition exhibits an apparent viscosity that is too high, the thermoplastic composition will generally be very difficult to process. In contrast, if the thermoplastic composition exhibits an apparent viscosity that is too low, the thermoplastic composition will generally result in an extruded fiber that has very poor tensile strength.

Therefore, it is generally desired that the thermoplastic composition exhibits an Apparent Viscosity value at a temperature of about 190° C. and a shear rate of about 1000 seconds$^{-1}$ that is beneficially between about 5 Pascal seconds (Pa.s) to about 250 Pascal seconds, more beneficially between about 10 Pascal seconds to about 225 Pascal seconds, suitably between about 15 Pascal seconds to about 200 Pascal seconds, more suitably between about 20 Pascal seconds to about 190 Pascal seconds, and most suitably between about 25 Pascal seconds to about 180 Pascal seconds. The method by which the Apparent Viscosity value is determined is set forth below in connection with the examples.

As used herein, the term "fiber" or "fibrous" is meant to refer to a material wherein the length to diameter ratio of such material is greater than about 10. Conversely, a "nonfiber" or "nonfibrous" material is meant to refer to a material wherein the length to diameter ratio of such material is about 10 or less.

Methods for making fibers are well known and need not be described here in detail. To form a fiber, generally, a thermoplastic composition is extruded and fed to a distribution system where the thermoplastic composition is introduced into a spinneret plate. The spun fiber is then cooled, solidified, and drawn, generally by a mechanical rolls system, to an intermediate filament diameter and collected. Subsequently, the fiber may be "cold drawn" at a temperature below its softening temperature, to the desired finished fiber diameter and is crimped/texturized and cut into a desirable fiber length. Fibers can be cut into relatively short lengths, such as staple fibers which generally have lengths in the range of about 25 to about 50 millimeters and short-cut fibers which are even shorter and generally have lengths less than about 18 millimeters.

Typical conditions for thermally processing the thermoplastic composition include using a shear rate that is beneficially between about 100 seconds$^{-1}$ to about 50000 seconds$^{-1}$, more beneficially between about 500 seconds$^{-1}$ to about 5000 seconds$^{-1}$, suitably between about 1000 seconds$^{-1}$ to about 3000 seconds$^{-1}$, and most suitably at about 1000 seconds$^{-1}$. Typical conditions for thermally processing the components also include using a temperature that is beneficially between about 100° C. to about 500° C., more beneficially between about 150° C. to about 300° C., suitably between about 175° C. to about 250° C., and suitably about 190° C.

The thermoplastic composition of the present invention is suited for preparing fibers or nonwoven structures that may be used in disposable products including disposable absorbent products such as diapers, adult incontinent products, and bed pads; in catamenial devices such as sanitary napkins, and tampons; and other absorbent products such as wipes, bibs, wound dressings, and surgical capes or drapes. Accordingly, in another aspect, the present invention relates to a disposable absorbent product comprising the fibers prepared from the thermoplastic composition of the present invention.

When used in a disposable absorbent product, it is generally desired that a fiber prepared from the thermoplastic composition of the present invention be hydrophilic. As used herein, the term "hydrophilic" refers to a material having a contact angle of water in air of less than 90 degrees. In contrast, as used herein, the term "hydrophobic" refers to a material having a contact angle of water in air of at least 90 degrees. The general subject of contact angles and the measurement thereof is well known in the art as, for example, in Robert J. Good and Robert J. Stromberg, Ed., in "Surface and Colloid Science—Experimental Methods", Vol. 11, (Plenum Press, 1979).

In one embodiment of the present invention, the thermoplastic composition is formed into a multicomponent fiber.

For purposes of illustration only, the present invention will generally be described in terms of a multicomponent fiber comprising only three components. However, it should be understood that the scope of the present invention is meant to include fibers with three or more components. In one embodiment, the thermoplastic composition of the present invention may be used to form the sheath of a multicomponent fiber while a polyolefin, such as polypropylene or polyethylene is used to form the core. Suitable structural geometries for multicomponent fibers include pie shape or side by side configurations.

When the thermoplastic composition of the present invention is formed into a multicomponent fiber, an exposed surface on at least a portion of the multicomponent fiber will typically be formed from the more prevalent material present in the multicomponent fiber. Such an exposed surface on at least a portion of the multicomponent fiber which will generally permit thermal bonding of the multicomponent fiber to other fibers which may be the same or different from the multicomponent fiber of the present invention. As a result, the multicomponent fiber can then be used to form thermally bonded fibrous nonwoven structures such as a nonwoven web.

In one embodiment of the present invention, the thermoplastic composition is formed into a fibrous matrix for incorporation into a disposable absorbent product. A fibrous matrix may take the form of, for example, a fibrous nonwoven web. Fibrous nonwoven webs may be made completely from fibers prepared from the thermoplastic composition of the present invention or they may be blended with other fibers. The length of the fibers used may depend on the particular end use contemplated. Where the fibers are to be degraded in water as, for example, in a toilet, it is advantageous if the lengths are maintained at or below about 15 millimeters.

The thermoplastic composition can also be used as a coated or co-extruded component of a flushable film for applications in composite cloth-like outercovers for flushable diapers, or as a baffle barrier film for feminine care napkins and adult incontinence products. These thermoplastic composition can also be used in cast film or blown film applications.

In one embodiment of the present invention, a disposable absorbent product is provided, which disposable absorbent product comprises a liquid-permeable topsheet, a backsheet attached to the liquid-permeable topsheet, and an absorbent structure positioned between the liquid-permeable topsheet and the backsheet, wherein the backsheet comprises fibers prepared from the thermoplastic composition of the present invention.

Absorbent products and structures according to all aspects of the present invention are generally subjected, during use, to multiple insults of a body liquid. Accordingly, the absorbent products and structures are desirably capable of absorbing multiple insults of body liquids in quantities to which the absorbent products and structures will be exposed during use. The insults are generally separated from one another by a period of time.

Test Procedures

Apparent Viscosity

A capillary rheometer, under the designation Göttfert Rheograph 2003 capillary rheometer, which was used in combination with WinRHEO (version 2.31) analysis software, both available from Göttfert Company of Rock Hill, S.C., was used to evaluate the apparent viscosity rheological properties of material samples. The capillary rheometer setup included a 2000 bar pressure transducer and a 30 mm length/30 mm active length/1 mm diameter/0 mm height/180° run in angle, round hole capillary die.

Once the instrument is warmed up and the pressure transducer is calibrated, the material sample is loaded incrementally into the column, packing resin into the column with a ramrod each time to ensure a consistent melt during testing. After material sample loading, a 2 minute melt time precedes each test to allow the material sample to completely melt at the test temperature. The capillary rheometer takes data points automatically and determines the apparent viscosity (in Pascal·second) at 7 apparent shear rates (in second$^{-1}$): 50, 100, 200, 500, 1000, 2000, and 5000. When examining the resultant curve it is important that the curve be relatively smooth. If there are significant deviations from a general curve from one point to another, possibly due to air in the column, the test run should be repeated to confirm the results.

The resultant rheology curve of apparent shear rate versus apparent viscosity gives an indication of how the material sample will run at that temperature in an extrusion process. The apparent viscosity value at a shear rate of about 1000 second$^{-1}$ and a temperature of about 190° C. is of specific interest because these are the typical conditions found in commercial fiber spinning extruders.

Weight Average Molecular Weight

A gas permeation chromatography (GPC) method may be used to determine the weight average molecular weight of polyethylene oxide samples.

A differential refractometer, available from Viscotek Corporation under the designation Knauer Differential Refractometer with a Viscotek Differential Viscometer, Model 100, is set up with two linear, 120 Angstrom Waters Ultrahydrogel gas permeation chromatography columns having a flow rate of about 1.0 ml/minute and an injection volume of 100 microliters. The mobile phase is a 0.05M sodium nitrate aqueous solution. The mobile phase is filtered with a 0.45 micron filter and degassed using a vacuum and an ultrasound bath. Polyethylene oxide standards are obtained having narrow molecular weight distributions with known peak average molecular weight and intrinsic viscosity values.

Samples of both the standard polyethylene oxides and experimental polyethylene oxide materials are prepared by dissolving about 10 to 25 mg (weighed to the nearest 0.0001 g) of a polyethylene oxide material into about 20.0 ml of the mobile phase solution in a clear borosilicate scintillation vial. Each standard and experimental sample is chromotagraphed three times in order to ensure reproducibility of results and to guard against unexpected instrumental upsets. The data is collected and calculated using Unical GPC software, version 4.03, available from Viscotek Corporation of Houston, Tex. The software manual describes in detail all the formulas, algorithms and convolute integrals used for the calculations. For each sample, the weight average molecular weight is obtain.

To confirm that the instrument is operating correctly, a number of checks are performed. The differential refractometer should have a reading of 3.0 millivolts on the detector output, the differential transducers on the viscometer should be set close to zero, and system back pressure should have a reading below 1000 psi. A monodisperse low molecular weight standard peak should be symmetrical and the total number of plates should be above 16,000 plates/bank.

Water Dispersability/Dissolution of a Fiber

The water dispersibility/dissolution evaluation of a fiber sample was done by immersing a fiber of about 300 microns in diameter and of a length of about 5 centimeters into a 100 milliliter beaker containing tap water at about 18° C. and examining the degree of the fiber's disintegration and dissolution over time. For a sample that dissolves or disintegrates into pieces smaller than 1 millimeter within 10 minutes of the beginning of the testing, the tested sample was defined as an "Instant" dispersibility. For a sample that dissolves or disintegrates into pieces smaller than 2 millimeter beyond 10 minutes but in less than 2 hours, the tested sample was referred to as a "Delayed" dispersibility. For a sample that dissolves or disintegrates into pieces smaller than 2 millimeter beyond 2 hours, the sample was defined as "Slow" dispersibility.

EXAMPLES

Example 1

A polyethylene oxide was obtained from Union Carbide Corporation of Danbury, Conn., under the designation POLYOX® WSRN-80 polyethylene oxide, which had a melting temperature of about 64° C., a melt flow at about 190° C. and 21.6 kilograms of between 25 to 35 grams/minute, and a reported weight average molecular weight of about 200,000. This polyethylene oxide was used in Samples 1, 2, and 4–13.

A polyethylene oxide was obtained from Union Carbide Corporation of Danbury, Conn., under the designation POLYOX® WSRN-750 polyethylene oxide, which had a melt flow at about 190° C. and 21.6 kilograms of between 3 to 4 grams/minute and a measured weight average molecular weight of about 458,000. This polyethylene oxide was used in Samples 3.

The polyethylene oxide polymer was mixed with various amounts of including both multicarboxylic acids and other materials. Adipic acid was used as the multicarboxylic acid in Samples 3–7 and 9–13. Glutaric acid was used as the multicarboxylic acid in Sample 8. In Sample 2, kaolin, an aluminum silicate with a specific gravity of about 2.63 and average particle size of about 0.5 microns, available from Burgess Pigment Co. of Sandersville, Ga., under the designation Polyclay aluminum silicate was used as a typical nucleating agent. In Samples 5, 7, and 10, 3 weight percent of 3,5-di-t-butyl-hydroxyltoluene (identified in Table 1 as BHT) available from Shell Chemical Co. of Houston, Tex., under the designation IONOL™ 3,5-di-t-butyl-hydroxyltoluene, was added to the mixture as an antioxidant.

The blend of the polyethylene oxide polymer with the additives involved dry mixing the components followed by melt mixing them together to provide vigorous mixing of the components, which was achieved in a counter-rotating twin screw extruder. Mixing was conducted on either a Brabender twin screw compounder or a Haake twin screw extruder with mixing screws.

Conversion of the prepared mixtures into fibers was conducted on an in-house fiber spinning line. The spinning line consists of a 0.75 inch diameter extruder with a 24:1 L:D (length:diameter) ratio screw and 3 heating zones which feeds into a spin pump, through a 0.62 inch Koch® SMX static mixer unit and then into the spinning head (representing the $4^{th}$ and $5^{th}$ heating zones), from which fibers are spun through a spinneret of 15 holes, where each hole has a 20 mil diameter. The fibers were air quenched at 15° C. and drawn down by a mechanical draw roll to where the fiber was either formed into a nonwoven or collected for further processing (such as crimping and cutting the fiber for the production of staple and short-cut fibers) before being formed into a nonwoven. The composition, temperature profile process conditions, evaluations for Apparent Viscosity values and water dispersibility, and comments on the processability of the prepared fibers are shown in Table 1.

TABLE 1

| Sample No. | Polyethylene Oxide Weight Percent | Additive Type and Weight Percent | Apparent Viscosity (Pa.s)(at 190° C., 1000s$^{-1}$) | Feeding of Thermplastic Composition | Processing Temperature Profile of the Extruder (° C.) | Fiber Processability Comments | Water Dispersibility |
|---|---|---|---|---|---|---|---|
| *Sample 1 | 100% | — | 374.5 | Difficult | 175/180/180/190/190 | Cannot be drawn into fiber, strong elastic retraction behavior and poor melt strength | Instant |
| *Sample 2 | 95% | Kaolin, 6% | 313.5 | Difficult | 175/180/180/190/190 | Cannot be drawn into fiber, strong elastic retraction behavior and poor melt strength | Instant |
| *Sample 3 | 75% | Adipic acid, 25% | 323.2 | Difficult | 175/180/180/190/190 | Cannot be drawn into fiber, strong elastic retraction behavior and poor melt strength | Delayed |
| Sample 4 | 80% | Adipic acid, 20% | 173.4 | Good | 150/155/160/165/170 | Cannot be drawn into fiber, strong elastic retraction behavior and poor melt strength | Delayed |
| Sample 5 | 80% | Adipic acid, 20% (3% BHT) | 181.6 | Good | 150/155/160/165/170 | Cannot be drawn into fiber, strong elastic retraction behavior and poor melt strength | Delayed |
| Sample 6 | 75% | Adipic acid, 25% | 149.8 | Good | 150/150/150/170/170 | Can be drawn up to 10 m/min, improved melt strength than the control | Delayed |
| Sample 7 | 75% | Adipic acid, 25% (3% BHT) | 155.6 | Good | 160/160/165/170/175 | Can be drawn up to 10 m/min, improved melt strength than the control | Delayed |
| Sample 8 | 75% | Glutaric acid, 25% | 117.2 | Good | 160/160/165/170/175 | Can be drawn up to 10 m/min, improved melt strength than the control | Delayed |
| Sample 9 | 60% | Adipic acid, 40% | 84.7 | Good | 150/155/160/165/170 | Can be drawn up to 100 m/min, melt strength allows for typical drawdown | Delayed |
| Sample 10 | 60% | Adipic acid, 40% (3% BHT) | 92.8 | Good | 160/160/165/165/170 | Can be drawn up to 10 m/min, improved melt strength than the control | Delayed |
| Sample 11 | 50% | Adipic acid, 50% | 53.7 | Good | 150/155/160/165/170 | Can be drawn up to 20 m/min, improved melt strength than the control | Delayed |
| Sample 12 | 40% | Adipic acid, 60% | 31.75 | Good | 140/145/155/165/165 | Can be drawn up over 100 m/min, melt strength allows for typical drawdown | Delayed |
| *Sample 13 | 20% | Adipic acid, 80% | Too low to be detected | Good | 150/155/160/165/170 | Poor melt strength | Slow |

*Not an example of the present invention.

Example 2

A blend of Union Carbide POLYOX® WSN80 polyethylene oxide and adipic acid in a 40:60 ratio was compounded with a twin screw-extruder. Bicomponent fibers with either a 1:1 core to sheath extruder throughput weight ratio structure or a 1:5 core to sheath extruder throughput weight ratio structure were prepared by using this thermoplastic composition as the sheath material and Himont PF305 polypropylene as the core material. The spinning was done on a bicomponent spinning line using two identical extruders, having the specifications identified in the monocomponent fiber section, feeding into a sheath/core bicomponent spin pack and spun through 16 holes of 12 mil diameter. The extruder temperature profile for the sheath in the five different zones is 150° C./1 55° C./160° C./165° C./170° C. and the extruder temperature for the core in the five different zones is 150° C./166° C./175° C./190° C./190° C. Likewise, the fiber was quenched down at 15° C. and drawn down to where it was either formed into a nonwoven or collected for further processing (such as crimping and cutting for production of staple and short-cut fibers) before being formed into a nonwoven. The fiber processability was significantly due to its improved melt strength and better melt flow properties, as evidenced by significantly improved maximum jet stretchability (a maximum jet stretchability of 295 for the core/sheath ratio of 1:1 and maximum jet stretchability of 136 for the core/sheath ratio of 1:5, as compared with a maximum jet stretchability of 0 for the control), reduced stickiness, and was less hygroscopic as compared with fibers made with 100 weight percent polyethylene oxide and other comparative examples. Less sensitivity to moisture and reduced adhesive properties makes the fiber much easier to handle during processing.

Those skilled in the art will recognize that the present invention is capable of many modifications and variations without departing from the scope thereof. Accordingly, the detailed description and examples set forth above are meant to be illustrative only and are not intended to limit, in any manner, the scope of the invention as set forth in the appended claims.

What is claimed is:

1. A thermoplastic composition comprising a mixture of:
   a. a polyethylene oxide polymer having a weight average molecular weight that is between about 100,000 to about 20,000,000, wherein the polyethylene oxide polymer is present in the thermoplastic composition in a weight amount that is between about 25 weight percent to about 85 weight percent; and
   b. a multicarboxylic acid having a total of carbon atoms that is less than about 30, wherein the multicarboxylic acid is present in the thermoplastic composition in a weight amount that is between about 15 weight percent to about 75 weight percent, wherein all weight percents are based on the total weight amount of the polyethylene oxide and the multicarboxylic acid present in the thermoplastic composition;
   wherein the thermoplastic composition exhibits an Apparent Viscosity value at a temperature of about 190° C. and a shear rate of about 1000 seconds$^{-1}$ that is between about 5 Pascal seconds to about 250 Pascal seconds.

2. The thermoplastic composition of claim 1 wherein the polyethylene oxide polymer has a weight average molecular weight that is between about 150,000 to about 10,000,000.

3. The thermoplastic composition of claim 1 wherein the multicarboxylic acid has a total of carbon atoms that is between about 3 to about 30.

4. The thermoplastic composition of claim 1 wherein the multicarboxylic acid is selected from the group consisting of malonic acid, citric acid, succinic acid, glutaric acid, adipic acid, pimelic acid, suberic acid, azelaic acid, sebacic acid, and mixtures thereof.

5. The thermoplastic composition of claim 1 wherein the polyethylene oxide polymer is present in the thermoplastic composition in a weight amount that is between about 30 weight percent to about 80 weight percent and the multicarboxylic acid is present in the thermoplastic composition in a weight amount that is between about 20 weight percent to about 70 weight percent.

6. The thermoplastic composition of claim 5 wherein the polyethylene oxide polymer is present in the thermoplastic composition in a weight amount that is between about 35 weight percent to about 75 weight percent and the multicarboxylic acid is present in the thermoplastic composition in a weight amount that is between about 25 weight percent to about 65 weight percent.

7. The thermoplastic composition of claim 1 wherein the thermoplastic composition exhibits an Apparent Viscosity value at a temperature of about 190° C. and a shear rate of about 1000 seconds$^{-1}$ that is between about 10 Pascal seconds to about 225 Pascal seconds.

8. The thermoplastic composition of claim 7 wherein the thermoplastic composition exhibits an Apparent Viscosity value at a temperature of about 190° C. and a shear rate of about 1000 seconds$^{-1}$ that is between about 15 Pascal seconds to about 200 Pascal seconds.

9. The thermoplastic composition of claim 1 wherein the polyethylene oxide polymer has a weight average molecular weight that is between about 150,000 to about 10,000,000 and the polyethylene oxide polymer is present in the thermoplastic composition in a weight amount that is between about 30 weight percent to about 80 weight percent, the multicarboxylic acid is present in the thermoplastic composition in a weight amount that is between about 20 weight percent to about 70 weight percent and is selected from the group consisting of malonic acid, citric acid, succinic acid, glutaric acid, adipic acid, pimelic acid, suberic acid, azelaic acid, sebacic acid, and mixtures thereof, and the thermoplastic composition exhibits an Apparent Viscosity value at a temperature of about 190° C. and a shear rate of about 1000 seconds$^{-1}$ that is between about 10 Pascal seconds to about 225 Pascal seconds.

10. A fiber prepared from a thermoplastic composition, the thermoplastic composition comprising a mixture of:
    a. a polyethylene oxide polymer having a weight average molecular weight that is between about 100,000 to about 20,000,000, wherein the polyethylene oxide polymer is present in the thermoplastic composition in a weight amount that is between about 25 weight percent to about 85 weight percent; and
    b. a multicarboxylic acid having a total of carbon atoms that is less than about 30, wherein the multicarboxylic acid is present in the thermoplastic composition in a weight amount that is between about 15 weight percent to about 75 weight percent, wherein all weight percents are based on the total weight amount of the polyethylene oxide and the multicarboxylic acid present in the thermoplastic composition;
    wherein the thermoplastic composition exhibits an Apparent Viscosity value at a temperature of about 190° C. and a shear rate of about 1000 seconds$^{-1}$ that is between about 5 Pascal seconds to about 250 Pascal seconds.

11. The fiber of claim 10 wherein the polyethylene oxide polymer has a weight average molecular weight that is between about 150,000 to about 10,000,000.

12. The fiber of claim 10 wherein the multicarboxylic acid has a total of carbon atoms that is between about 3 to about 30.

13. The fiber of claim 10 wherein the multicarboxylic acid is selected from the group consisting of malonic acid, citric acid, succinic acid, glutaric acid, adipic acid, pimelic acid, suberic acid, azelaic acid, sebacic acid, and mixtures thereof.

14. The fiber of claim 10 wherein the polyethylene oxide polymer is present in the thermoplastic composition in a weight amount that is between about 30 weight percent to about 80 weight percent and the multicarboxylic acid is present in the thermoplastic composition in a weight amount that is between about 20 weight percent to about 70 weight percent.

15. The fiber of claim 14 wherein the polyethylene oxide polymer is present in the thermoplastic composition in a weight amount that is between about 35 weight percent to about 75 weight percent and the multicarboxylic acid is present in the thermoplastic composition in a weight amount that is between about 25 weight percent to about 65 weight percent.

16. The fiber of claim 10 wherein the thermoplastic composition exhibits an Apparent Viscosity value at a temperature of about 190° C. and a shear rate of about 1000 seconds$^{-1}$ that is between about 10 Pascal seconds to about 225 Pascal seconds.

17. The fiber of claim 16 wherein the thermoplastic composition exhibits an Apparent Viscosity value at a temperature of about 190° C. and a shear rate of about 1000 seconds$^{-1}$ that is between about 15 Pascal seconds to about 200 Pascal seconds.

18. The fiber of claim 10 wherein the polyethylene oxide polymer has a weight average molecular weight that is between about 150,000 to about 10,000,000 and the polyethylene oxide polymer is present in the thermoplastic composition in a weight amount that is between about 30 weight percent to about 80 weight percent, the multicarboxylic acid is present in the thermoplastic composition in a weight amount that is between about 20 weight percent to about 70 weight percent and is selected from the group consisting of malonic acid, citric acid, succinic acid, glutaric acid, adipic acid, pimelic acid, suberic acid, azelaic acid, sebacic acid, and mixtures thereof, and the thermoplastic composition exhibits an Apparent Viscosity value at a temperature of about 190° C. and a shear rate of about 1000 seconds$^{-1}$ that is between about 10 Pascal seconds to about 225 Pascal seconds.

19. A disposable absorbent product comprising a liquid-permeable topsheet, a backsheet attached to the liquid-permeable topsheet, and an absorbent structure positioned between the liquid-permeable topsheet and the backsheet, wherein the backsheet comprises fibers prepared from a thermoplastic composition comprising a mixture of:

a. a polyethylene oxide polymer having a weight average molecular weight that is between about 100,000 to about 20,000,000, wherein the polyethylene oxide polymer is present in the thermoplastic composition in a weight amount that is between about 25 weight percent to about 85 weight percent; and b. a multicarboxylic acid having a total of carbon atoms that is less than about 30, wherein the multicarboxylic acid is present in the thermoplastic composition in a weight amount that is between about 15 weight percent to about 75 weight percent, wherein all weight percents are based on the total weight amount of the polyethylene oxide and the multicarboxylic acid present in the thermoplastic composition;

wherein the thermoplastic composition exhibits an Apparent Viscosity value at a temperature of about 190° C. and a shear rate of about 1000 seconds$^{-1}$ that is between about 5 Pascal seconds to about 250 Pascal seconds.

20. The disposable absorbent product of claim 19 wherein the polyethylene oxide polymer has a weight average molecular weight that is between about 150,000 to about 10,000,000.

21. The disposable absorbent product of claim 19 wherein the multicarboxylic acid has a total of carbon atoms that is between about 3 to about 30.

22. The disposable absorbent product of claim 19 wherein the multicarboxylic acid is selected from the group consisting of malonic acid, citric acid, succinic acid, glutaric acid, adipic acid, pimelic acid, suberic acid, azelaic acid, sebacic acid, and mixtures thereof.

23. The disposable absorbent product of claim 19 wherein the polyethylene oxide polymer is present in the thermoplastic composition in a weight amount that is between about 30 weight percent to about 80 weight percent and the multicarboxylic acid is present in the thermoplastic composition in a weight amount that is between about 20 weight percent to about 70 weight percent.

24. The disposable absorbent product of claim 23 wherein the polyethylene oxide polymer is present in the thermoplastic composition in a weight amount that is between about 35 weight percent to about 75 weight percent and the multicarboxylic acid is present in the thermoplastic composition in a weight amount that is between about 25 weight percent to about 65 weight percent.

25. The disposable absorbent product of claim 19 wherein the thermoplastic composition exhibits an Apparent Viscosity value at a temperature of about 190° C. and a shear rate of about 1000 seconds$^{-1}$ that is between about 10 Pascal seconds to about 225 Pascal seconds.

26. The disposable absorbent product of claim 25 wherein the thermoplastic composition exhibits an Apparent Viscosity value at a temperature of about 190° C. and a shear rate of about 1000 seconds$^{-1}$ that is between about 15 Pascal seconds to about 200 Pascal seconds.

27. The disposable absorbent product of claim 19 wherein the polyethylene oxide polymer has a weight average molecular weight that is between about 150,000 to about 10,000,000 and the polyethylene oxide polymer is present in the thermoplastic composition in a weight amount that is between about 30 weight percent to about 80 weight percent, the multicarboxylic acid is present in the thermoplastic composition in a weight amount that is between about 20 weight percent to about 70 weight percent and is selected from the group consisting of malonic acid, citric acid, succinic acid, glutaric acid, adipic acid, pimelic acid, suberic acid, azelaic acid, sebacic acid, and mixtures thereof, and the thermoplastic composition exhibits an Apparent Viscosity value at a temperature of about 190° C. and a shear rate of about 1000 seconds$^{-1}$ that is between about 10 Pascal seconds to about 225 Pascal seconds.

\* \* \* \* \*